United States Patent Office 3,033,833
Patented May 8, 1962

3,033,833
HYDROPHILIC INTERPOLYMERS OF POLYMERIZABLE ETHYLENICALLY UNSATURATED COMPOUNDS AND SULFO ESTERS OF α-METHYLENE CARBOXYLIC ACIDS
Walter J. Le Fevre and David P. Sheetz, Midland, Mich., assignors to The Dow Chemical Company, Midland, Mich., a corporation of Delaware
No Drawing. Filed Mar. 25, 1957, Ser. No. 647,953
12 Claims. (Cl. 260—79.3)

This invention concerns novel and useful addition interpolymers of polymerizable ethylenically unsaturated compounds comprising sulfo esters of α-methylene carboxylic acids.

A pending application, Serial No. 647,974, filed concurrently herewith by Walter J. Le Fevre and David P. Sheetz, now U.S. Patent No. 3,024,221, discloses a class of polymerizable sulfo esters having the general formula

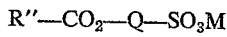

wherein the radical R″— is selected from the group consisting of vinyl and α-substituted vinyl and the radical —Q— is a divalent hydrocarbon radical having its valence bonds on different carbon atoms and M is a cation. Such esters are equivalent to sulfo esters of α-methylene carboxylic acids, i.e. esters of α-methylene carboxylic acids such as acrylic or methacrylic acid and hydroxy sulfonic acids such as isethionic acid, and are also representable by the formula

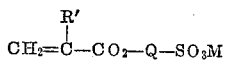

wherein the symbol R′ represents hydrogen, a halogen such as chlorine, or an organic radical such as an alkyl radical, the symbol —Q— represents a bivalent organic radical having its valence bonds on two different carbon atoms, such as an alkylene radical, and M is a member of the group consisting of hydrogen, ammonium bases, and metals. The homopolymers of such sulfo esters are generally soluble in water.

It is an object of this invention to provide new and useful addition interpolymers comprising sulfo esters of α-methylene carboxylic acids and other polymerizable ethylenically unsaturated compounds.

Other objects and advantages of the invention will be evident in the following description.

The objects of this invention have been attained in addition interpolymers of a sulfo ester of an α-methylene carboxylic acid or sulfonate salt thereof and a different polymerizable ethylenically unsaturated compound.

The sulfo esters with which this invention is concerned are described and claimed in the above-identified patent application, Serial No. 647,974, now U.S. Patent No. 3,024,221. These esters are obtainable by interaction of an α-methylene carboxylic acid or acid chloride and a hydroxy sulfonic acid. Specific examples of α-methylene carboxylic acids from which the sulfo esters can be obtained are Acrylic acid
Methacrylic acid
α-Ethylacrylic acid
α-Propylacrylic acid
α-Butylacrylic acid
α-Pentylacrylic acid
α-Hexylacrylic acid
Atropic acid
α-Cyclohexylacrylic acid
α-Furylacrylic acid
α-Chloroacrylic acid.

Specific examples of hydroxy sulfonic acid compounds (and their salts) that can be esterified with the α-methylene carboxylic acids (or their acid halides) to produce the sulfo esters are 2-hydroxyethanesulfonic acid (isethionic acid)
2-hydroxy-1-propanesulfonic acid
1-hydroxy-2-propanesulfonic acid
2-hydroxy-1-butanesulfonic acid
1-hydroxy-2-butanesulfonic acid
3-hydroxy-2-butanesulfonic acid
1-hydroxy-2-methyl-2-propanesulfonic acid
2-hydroxy-2-methyl-1-propanesulfonic acid
3-bromo-1-hydroxy-2-propanesulfonic acid
3-bromo-2-hydroxy-1-propanesulfonic acid
3-chloro-1-hydroxy-2-propanesulfonic acid
3-chloro-2-hydroxy-1-propanesulfonic acid
1-bromo-2-hydroxy-3-butanesulfonic acid
1-bromo-3-hydroxy-2-butanesulfonic acid
1-chloro-2-hydroxy-3-butanesulfonic acid
1-chloro-3-hydroxy-2-butanesulfonic acid
3-bromo-1-hydroxy-2-butanesulfonic acid
3-bromo-2-hydroxy-1-butanesulfonic acid
3-chloro-1-hydroxy-2-butanesulfonic acid
3-chloro-2-hydroxy-1-butanesulfonic acid
1-chloro-2-hydroxy-2-methyl-3-propanesulfonic acid
1-chloro-3-hydroxy-2-methyl-2-propanesulfonic acid
1-chloro-2-(chloromethyl)-2-hydroxy-3-propanesulfonic acid
1-chloro-2-(chloromethyl)-3-hydroxy-2-propanesulfonic acid
1-hydroxy-3-methoxy-2-propanesulfonic acid
2-hydroxy-3-methoxy-1-propanesulfonic acid
2-hydroxycyclohexanesulfonic acid
2-hydroxy-2-phenylethanesulfonic acid
2-hydroxy-1-phenylethanesulfonic acid
2-bromo-3-hydroxy-2-methyl-3-phenyl-1-propanesulfonic acid
3-hydroxy-1-propanesulfonic acid
3-hydroxy-1-butanesulfonic acid
1-hydroxy-3-butanesulfonic acid
4-hydroxy-1-butanesulfonic acid
ar-Phenolsulfonic acid
ar-(2-hydroxyethoxy)benzenesulfonic acid.

Specific examples of sulfo esters of α-methylene carboxylic acids which are suitable for making the interpolymers of the present invention are the following (and their sulfonate salts):

2-sulfoethyl acrylate
2-sulfoethyl methacrylate
2-sulfoethyl α-ethylacrylate
2-sulfoethyl α-propylacrylate
2-sulfoethyl α-butylacrylate
2-sulfoethyl α-hexylacrylate
2-sulfoethyl α-cyclohexylacrylate
2-sulfoethyl α-chloroacrylate
2-sulfo-1-propyl acrylate
2-sulfo-1-propyl methacrylate
1-sulfo-2-propyl acrylate and methacrylate
2-sulfo-1-butyl acrylate and methacrylate
1-sulfo-2-butyl acrylate and methacrylate
3-sulfo-2-butyl acrylate and methacrylate
2-methyl-2-sulfo-1-propyl acrylate
2-methyl-1-sulfo-2-propyl acrylate
3-bromo-2-sulfo-1-propyl acrylate
3-bromo-1-sulfo-2-propyl acrylate
3-chloro-2-sulfo-1-propyl acrylate
3-chloro-1-sulfo-2-propyl acrylate
1-bromo-3-sulfo-2-butyl acrylate
1-bromo-2-sulfo-3-butyl acrylate
1-chloro-3-sulfo-2-butyl acrylate
1-chloro-2-sulfo-3-butyl acrylate
3-bromo-2-sulfo-1-butyl acrylate
3-bromo-1-sulfo-2-butyl acrylate 3-chloro-2-sulfo-1-butyl acrylate
3-chloro-1-sulfo-2-butyl acrylate
1-chloro-2-methyl-3-sulfo-2-propyl acrylate
1-chloro-2-methyl-2-sulfo-3-propyl acrylate
1-chloro-2-(chloromethyl)-3-sulfo-2-propyl acrylate
1-chloro-2-(chloromethyl)-2-sulfo-3-propyl acrylate
3-methoxy-2-sulfo-1-propyl acrylate
3-methoxy-1-sulfo-2-propyl acrylate
2-sulfocyclohexyl acrylate
2-phenyl-2-sulfoethyl acrylate
1-phenyl-2-sulfoethyl acrylate
3-sulfo-1-propyl acrylate
3-sulfo-1-butyl acrylate
4-sulfo-1-butyl acrylate
ar-Sulfophenyl acrylate
ar-Sulfophenyl methacrylate
2-(ar-sulfophenoxy)ethyl acrylate.

In some of these sulfo esters, e.g. in esters of hydroxyalkanesulfonic acids, the bivalent radical corresponding to the symbol —Q— in the aforementioned formulae has both valence bonds on aliphatic carbon atoms; in others, e.g. in phenol sulfonic acids, both valence bonds of the radical are on aromatic nuclei, while in still others, one of the valence bonds is on an aromatic nucleus and the other is on an aliphatic carbon atom.

These sulfo esters are in most instances liquids that are soluble in water and that form salts with ammonium bases, such as ammonia and organic amines, with metal bases such as the alkali metal and alkaline earth metal bases, and with other base-acting reagents. The salts of the sulfo esters are in most instances crystalline solids that are soluble in water, slightly soluble in lower alcohols, and insoluble in most other organic liquids.

Any of the many known polymerizable ethylenically unsaturated compounds can be copolymerized with the sulfo esters of α-methylene carboxylic acids to make the interpolymers of this invention. Among such known polymerizable ethylenicaly unsaturated compounds are the alkenyl-aromatic compounds, i.e. the styrene compounds, the ethylenically unsaturated acids and derivatives such as the acrylic acids and salts, acrylic esters, acrylic nitriles, acrylic amides, acrylic anhydrides, maleic esters, maleic anhydride, maleic acid polyesters, unsaturated alcohol esters, unsaturated ketones, unsaturated ethers, and other compounds containing one or more ethylenic linkages capable of addition polymerization. Specific examples of such ethylenically unsaturated compounds are styrene, α-methylstyrene, ar-methylstyrene, ar-ethylstyrene, α,ar-dimethylstyrene, ar,ar-dimethylstyrene, divinylbenzene, vinylnaphthalene, divinylnaphthalene, vinylbenzenesulfonic acid, divinylbenzenesulfonic acid, hydroxystyrene, methoxystyrene, aminostyrene, cyanostyrene, acetyl-styrene, monochlorostyrene, dichlorostyrene and other halostyrenes, acrylic acid and salts, methacrylic acids and salts, methyl methacrylate, ethyl acrylate, glycol diacrylate, hexyl acrylate, lauryl methacrylate, phenyl acrylate, allyl acrylate, acrylonitrile, methacrylonitrile, acrylamide, methacrylamide, acrylanilide, acrylic anhydride, ethyl α-chloroacrylate, ethyl maleate, maleic anhydride, polyglycol maleate, diallyl fumarate, vinyl acetate, vinyl propionate, vinyl butyrate, vinyl benzoate, vinyl chloride, vinyl bromide, vinylidene chloride, vinylidene bromide, vinylidene cyanide, vinyl methyl ketone, methyl isopropenyl ketone, vinyl carbazole, vinyl ethyl ether, divinyl ether, isobutylene, 1,3-butadiene, isoprene, and the like.

The interpolymers of this invention are prepared by subjecting to conditions conductive to polymerization a composition comprising an intimate mixture of an appreciable proportion of at least one of the polymerizable sulfo esters of α-methylene carboxylic acids and an appreciable proportion of at least one other polymerizable ethylenically unsaturated compound, both as hereinbefore identified. The proportions of the diverse kinds of polymerizable monomers in the mixture can, of course, be varied widely depending upon the kind of copolymer product desired. Compositions predominating in one or more of the sulfo esters of α-methylene carboxylic acids will give rise to copolymers whose properties are predominately those of the polymerized sulfo esters as advantageously modified in kind and degree by the other polymerizable ethylenically unsaturated compound chemically combined in the copolymer. Those compositions that predominate in such other polymerizable ethylenically unsaturated monomer will give rise to copolymer products whose properties are predominately those of the polymerized ethylenically unsaturated monomer as advantageously modified in kind and degree by the sulfo ester of the α-methylene carboxylic acid chemically combined therein. In some instances the amount of one of these kinds of materials required to significantly modify the polymer properties is extremely small. For instance, only a small amount, e.g. 0.5 percent by weight, of divinylbenzene in an α-methylene carboxylic acid sulfo ester provides a copolymer having an appreciable degree of crosslinking thereby decreasing its solubility and swellability by aqueous media. On the other hand, only a small amount, e.g. 0.5 percent by weight, of an α-methylene carboxylic acid sulfo ester in a hydrophobic ethylenically unsaturated monomer provides a copolymer having an appreciable increase in hydrophilic properties. In most instances, the copolymers of this invention are derived from starting mixtures containing from 0.5 to 99.5 parts by weight of each of the types of starting monomers.

The polymeriztaion of the starting mixture of monomers can be carried out in mass, i.e. in the absence of any diluent, in solution in solubilizing liquids, or while suspended in non-solvent liquids. The polymerization is accelerated by heat and is catalyzed by exposure to activating radiations and by contact with free radical catalysts such as α,α′-azobisisobutyronitrile and the peroxygen compounds such as cumene hydroperoxide and potassium persulfate.

The following examples illustrate the interpolymers and preparation thereof according to this invention, but are not to be construed as limiting its scope. In the examples, parts and percentages are by weight unless otherwise indicated.

EXAMPLE 1

A number of interpolymers were prepared by emulsion polymerization procedure using starting compositions as shown in Table 1 and identified as Tests A through F. In each test, the starting composition, containing the ingredients shown in Table 1, was de-oxygenated by blowing with air-free nitrogen and was enclosed in a polymerization vessel and was heated at 70° C. for the times shown in Table 1.

Further treatments, if any, and descriptions of the resulting interpolymeric product are set forth below.

Test A.—The resulting product was a stable colloidal dispersion containing 28 percent of the copolymer of styrene and sodiosulfobutyl acrylate. The dispersion was very stable to polyvalent cations and could be diluted with a concentrated calcium chloride solution without coagulating the polymer dispersion.

The dry solid interpolymer, obtained by evaporation of water from the aqueous dispersion, was hydrophilic and was readily redispersible in water to regenerate an aqueous colloidal dispersion.

Test B.—The polymerization product was a gel-like mass swollen with water. This was chopped into pieces which were thoroughly washed with water and dried to obtain 40 g. of a copolymer of acrylonitrile and 2-sodiosulfoethyl acrylate.

The copolymer was soluble in dimethyl formamide, and from a solution in dimethyl formamide there were obtained clear films having a high affinity for basic dyes.

The copolymer was swellable but not soluble in water and was an effective cation exchange resin.

*Test C.*—The polymerization product was a very stable aqueous colloidal dispersion containing approximately 45 percent of a copolymer of styrene, butadiene, and sodiosulfobutyl acrylate. The dispersion, when dried in a thin layer on supporting solid surface, deposited an adherent, tough, continuous film of hydrophilic polymer. Copolymers of from 40 to 60 mole percent of a conjugated aliphatic diolefin such as 1,3-butadiene, at least 15 mole percent of an alkenylaromatic compound such as styrene, and from 0.1 to 5 percent by weight of a sulfo ester of an α-methylene carboxylic acid, in the form of aqueous colloidal dispersions, are particularly suited for use as, or in the preparation of, coating compositions such as latex paints.

*Test D.*—The polymerization product was a very stable aqueous colloidal dispersion containing approximately 34 percent of the copolymer of sodiosulfopropyl acrylate and vinylidene chloride. The dispersion could be diluted with concentrated calcium chloride solution without effecting coagulation of the polymer.

*Test E.*—The polymerization product was a very stable aqueous colloidal dispersion containing approximately 47 percent of the copolymer of 2-sodiosulfoethyl methacrylate, ethyl acrylate, and vinyl acetate. The dispersion, when dried in a thin layer on a supporting solid surface, deposited an adherent, tough, clear, continuous film.

*Test F.*—The polymerization product was a gel-like mass swollen with water. The gel was cut into pieces which were thoroughly washed with water and dried to provide 31 grams of a copolymer of acrylonitrile and sodiosulfopropyl acrylate. The copolymer was insoluble in water but soluble in dimethyl formamide. By evaporation of solvent from a thin layer of a dimethyl formamide solution, there were obtained thin films or foils of the copolymer. These films were insoluble in water but were highly swellable thereby. The films were highly receptive to dyes, e.g. du Pont "Brilliant Green". Analysis of the copolymer showed 5.83 percent sulfur, corresponding to approximately 39.4 percent of sodiosulfopropyl acrylate polymerically combined in the copolymer.

*Table 1*

| Test | A | B | C | D | E | F |
|---|---|---|---|---|---|---|
| Water ml | 99 | 100 | 47 | 99 | 48 | 100 |
| 30 percent Hydrogen Peroxide ml | 1 | | 3 | 1 | 1 | |
| Fe+++ (Ferric Nitrate) mg | 0.5 | | 0.25 | 0.5 | 0.5 | |
| $K_2S_2O_8$ g | | 0.05 | | | | 0.05 |
| Alkylbenzene Sulfonic Acid Wetting Agent g | | 2.5 | | | | 2.5 |
| Sodio-2-sulfoethyl Acrylate g | | 25 | | | | |
| Sodio-2-sulfoethyl Methacrylate [1] g | | | | | 0.15 | |
| Sodiosulfopropyl acrylate [2] g | | | | 6 | | 25 |
| Sodiosulfobutyl acrylate [3] g | 4 | | 2 | | | |
| Styrene g | 50 | | 31 | | | |
| Acrylonitrile g | | | | | | 25 |
| 1,3-Butadiene g | | 25 | 19 | | | |
| Vinylidene Chloride g | | | | 50 | | |
| Ethyl Acrylate g | | | | | 10 | |
| Vinyl Acetate g | | | | | 40 | |
| Time at 70° C hours | 16 | 16 | 17 | 3.5 | 3 | 2.5 |

[1] Containing 73 percent 2-sodiosulfoethyl methacrylate.
[2] Comprising a mixture of 2-sodiosulfo-1-propyl acrylate and 1-sodiosulfo-2-propyl acrylate.
[3] Comprising a mixture of 2-sodiosulfo-1-butyl acrylate and 1-sodiosulfo-2-butyl acrylate.

The 2-sodiosulfoethyl acrylate employed in Test B shown in Table 1 was a technical grade obtained by the following procedure. A mixture of 200 ml. of o-dichlorobenzene and 74 grams of finely ground sodium isethionate was heated at temperatures between 135° and 145° C. while 50 grams of acryloyl chloride was dropped into the mixture over a period of 20 minutes. The temperature was raised to 176° C. for one hour, after which the mixture was cooled to room temperature and filtered. The filter cake was washed with isopropanol and dried to obtain 94 grams of a white, crystalline product which contained approximately 77 percent of 2-sodiosulfoethyl acrylate, together with some 2-sodiosulfoethyl β-chloropropionate. The product is soluble in water and can be recrystallized from hot methanol.

The 2-sodiosulfoethyl methacrylate used in Test E of Table 1 was a technical grade obtained by heating a mixture of 100 ml. of chlorobenzene, 74 grams of sodium isethionate, and 60 grams of methacryloyl chloride under atmospheric pressure reflux with stirring for one hour. After cooling to room temperature, the reaction mixture was diluted with 500 ml. of acetone and was filtered to obtain a filter cake which was washed with acetone and dried to yield 100 grams of white crystalline product containing 73 percent by weight of 2-sulfoethyl methacrylate, sodium salt, together with some 2-sodiosulfoethyl β-chloropropionate.

The sodiosulfopropyl acrylate used in Tests D and F of Table 1 was a technical grade obtained by heating a mixture of 400 ml. of n-heptane, 162 grams of the sodium salt of hydroxypropanesulfonic acid (a mixture of the sodium salts of 2-hydroxy-1-propanesulfonic acid and 1-hydroxy-2-propanesulfonic acid), 100 grams of acryloyl chloride, and 2 grams of hydroquinone at 80° C. for 0.5 hour and at reflux (95° C.) for an additional two hours. The resulting reaction mixture was cooled, and the liquid layer was decanted from a waxy solid. The latter was triturated with diethyl ether yielding a crystalline solid which was collected on a filter, washed with diethyl ether, and dried to provide 202 grams of a product that contained approximately 70 percent of a mixture of 2-sodiosulfo-1-propyl acrylate and 1-sodiosulfo-2-propyl acrylate, together with some of the corresponding sodiosulfopropyl β-chloropropionates.

The sodiosulfobutyl acrylate used in Tests A and C of Table 1 was a technical grade obtained in like manner by interaction of acryloyl chloride on a mixture of the sodium salts of 2-hydroxy-1-butanesulfonic acid and 1-hydroxy-2-butanesulfonic acid to obtain a mixture consisting principally of 2-sodiosulfo-1-butyl acrylate and 1-sodiosulfo-2-butyl acrylate, together with some of the corresponding sodiosulfobutyl β-chloropropionates.

EXAMPLE 2

A solution was prepared containing 50 g. of technical grade sodiosulfopropyl acrylate (a mixture comprising sodio-2-sulfo-1-propyl acrylate and sodio-1-sulfo-2-propyl acrylate prepared as described in Example 1), 50 g. of lauryl methacrylate, 150 ml. of isopropanol, 12 ml. of water, and 0.2 g. of benzoyl peroxide. The solution was de-oxygenated by blowing with oxygen-free nitrogen, and was thereafter sealed in a polymerization vessel and heated at 70° C. for 18 hours. A gummy mass of polymer was separated from a liquid menstruum and was triturated with 400 ml. of isopropanol to produce a granular solid. This solid was separated from the isopropanol and dried to 65 grams of granular solid polymer.

The solid polymer was analyzed and found to contain 9.60 percent sulfur, corresponding to an interpolymer of 65 percent sodiosulfopropyl acrylate and 35 percent lauryl methacrylate.

The polymer was soluble in water to form opalescent solutions. Water solutions of the polymer, when shaken with a water-immiscible liquid such as toluene, formed stable oil-in-water colloidal emulsions.

A solution (designated "solution A") was prepared by dissolving 5 grams of the copolymer just described in a mixture of 5 grams of acetone and 10 grams of water, evaporating the acetone, and diluting the residue to 100 mls. with water while stirring the mixture. Another solution (designated "solution B") was prepared containing 50 percent of the 2-propoxyisopropyl ester of 2,4-dichlorophenoxyacetic acid and 50 percent of toluene. A stable colloidal emulsion was prepared by brief agitation of a mixture of 100 mls. of water, 1 ml. of the toluene solution ("solution B"), and 1 ml. of the sulfoester copolymer solution ("solution A"). The resulting colloidal emulsion was much more stable and uniform than the dispersion obtained by employing 0.1 ml. of a 50 percent solution in water of a conventional emulsifier (a polyglycol ether of octylphenol) in place of "solution A" in the above-described recipe.

EXAMPLE 3

Into a polymerization reactor was charged 24 grams of water, 50 grams of methanol, 26 grams of technical grade 2-sodiosulfoethyl acrylate (containing 77 percent 2-sodiosulfoethyl acrylate and some 2-sodiosulfoethyl β-chloropropionate), 0.2 gram of technical grade divinylbenzene (containing approximately 55 percent divinylbenzene, 35 percent ethylvinylbenzene and 10 percent diethylbenzene), and 0.2 gram of ammonium persulfate. The resulting mixture was deoxygenated by blowing with oxygen-free nitrogen and was heated with agitation at 70° C. for two hours. The resulting cross-linked copolymer was insoluble in, but highly swellable by, water.

EXAMPLE 4

Copolymers of acrylonitrile and sulfopropyl acrylate (Test A) and of acrylonitrile and 2-sulfoethyl acrylate (Test B) were prepared by polymerizing mixtures of the corresponding monomers in solution in 60 percent zinc chloride aqueous solution by heating at 50° C. for approximately 16 hours with the following results.

| Test | Sulfo Ester Co-monomer | Sulfo Ester in Polymer | | Polymer in Solution, Percent | Brookfield Viscosity, Cps. 50° C. |
|---|---|---|---|---|---|
| | | Weight, Percent | Mole, Percent | | |
| A | Sulfopropyl acrylate [1] | 5.5 | 1.57 | 9.9 | 886 |
| B | 2-Sulfoethyl acrylate [2] | 7.4 | 2.3 | 10.5 | 1,764 |
| C | 2-Sulfoethyl acrylate [3] | 4.45 | 1.36 | 10.95 | 922 |

[1] A technical grade containing approximately 70 percent of a mixture of 2-sodiosulfo-1-propyl acrylate and 1-sodiosulfo-2-propyl acrylate, prepared as described in Example 1.
[2] A technical grade containing approximately 77 percent of 2-sodiosulfoethyl acrylate, prepared as described in Example 1.
[3] A blend of 100 parts of copolymer solution B and 59.5 parts of a similar solution containing 11.7 percent of homopolymeric acrylonitrile.

The interpolymers just described were spun (by the procedure known per se for spinning acrylonitrile polymer fibers from zinc chloride solutions) to obtain excellent fibers having these physical properties:

| Fiber Corresponding to Test | Denier | Yield [1] | Elongation, Percent | Tenacity [1] |
|---|---|---|---|---|
| A | 2.8 | 1.1 | 29 | 4.2 |
| B | 2.9 | 0.7 | 30 | 2.5 |
| C | 2.9 | 0.7 | 30 | 2.5 |

[1] Grams per denier.

The above-described fibers had excellent dyeability for acetate, basic, and vat dyes. The dyed fibers, e.g. in the form of knitted tow, had excellent lightfastness, crockfastness, washfastness, and stability to dry cleaning. In many of these respects, the copolymer compositions were superior to homopolymeric acrylonitrile. For the purpose of making fibers and the like, interpolymers containing from 0.5 to 15 percent of a sulfo ester of an α-methylene carboxylic acid and correspondingly from 99.5 to 85 percent of acrylonitrile are particularly advantageous.

EXAMPLE 5

An aqueous solution containing 100 grams of water, 10 grams of p-sodiosulfophenyl methacrylate, 25 grams of acrylonitrile, 1.25 grams of sodium dodecylbenzenesulfonate, and 0.1 gram of potassium persulfate was heated at 70° C. with agitation for 16 hours. The polymerization reaction product was a water-swollen gel that was cut up, washed with water, and dried to obtain 24.6 grams of dry polymeric product. This polymeric product contained 2.63 percent by weight of sulfur, corresponding to a copolymer of 78.3 percent acrylonitrile and 21.7 percent p-sodiosulfophenyl methacrylate.

The copolymer was insoluble in water, but was soluble in dimethylformamide. A 5 percent solution of the copolymer in dimethylformamide was spread in a thin layer on a solid supporting surface and dried to obtain a transparent, flexible film. This copolymer film had a much greater affinity for dyes such as du Pont "Brilliant Green" dye than did a similar film of homopolymeric acrylonitrile.

In accordance with the present invention, hydrophilic polymers can be prepared whose properties otherwise depend at least in part upon the kind and proportions of comonomeric ingredients that are polymerically combined therein. Interpolymers of normally hydrophobic monomers and minor proportions of sulfo esters of the kind hereinbefore described give rise to useful products that are antistatic and susceptible to dyeing. Larger proportions of the sulfo esters in the interpolymer give rise to water-dispersible or water-soluble compositions useful as surface active agents, soil conditioning agents, thickeners and stabilizers for colloidal emulsions and dispersions such as polymer latexes, textile sizes, dye assistants and the like. Water-insoluble interpolymers containing major proportions of sulfo esters polymerically combined therein are useful ion exchange agents.

We claim:

1. An addition interpolymer of appreciable proportions of different kinds of ethylenically unsaturated monomers of which one kind is a sulfo ester having the formula

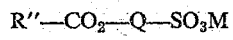

wherein R″ is a radical selected from the group consisting of vinyl and α-substituted vinyl radicals, —Q— is a divalent hydrocarbon radical having its valence bonds on different carbon atoms, and M is a cation.

2. An addition interpolymer according to claim 1 wherein the sulfo ester is a 2-sulfoethyl acrylate.

3. An addition interpolymer according to claim 1 wherein the sulfo ester is a 2-sulfoethyl methacrylate.

4. An addition interpolymer according to claim 1 wherein the sulfo ester is a sulfophenyl acrylate.

5. An addition interpolymer according to claim 1 wherein the sulfo ester is a sulfophenyl methacrylate.

6. An addition interpolymer according to claim 1 wherein the ethylenically unsaturated monomers comprise the sulfo ester and acrylonitrile.

7. An addition interpolymer according to claim 1 wherein the ethylenically unsaturated monomers comprise the sulfo ester and styrene.

8. An addition interpolymer according to claim 1 wherein the ethylenically unsaturated monomers comprise the sulfo ester and 1,3-butadiene.

9. An addition interpolymer according to claim 1 wherein the ethylenically unsaturated monomers comprise the sulfo ester and an alkyl acrylate.

10. An addition interpolymer according to claim 1 wherein the ethylenically unsaturated monomers comprise the sulfo ester and vinyl acetate.

11. An addition interpolymer according to claim 1 of from 40 to 60 mole percent 1,3-butadiene, at least 15 mole percent styrene, and from 0.1 to 5 percent by weight of the sulfo ester.

12. A method of making an addition interpolymer which comprises polymerizing by heating in the presence of a polymerization catalyst a composition comprising a mixture of different kinds of polymerizable ethylenically unsaturated monomers of which one kind is a sulfo ester having the formula

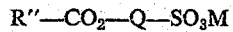

wherein R″ is a radical selected from the group consisting of vinyl and α-substituted vinyl radicals, —Q— is a divalent hydrocarbon radical having its valence bonds on different carbon atoms, and M is a cation in amount from about 0.5 to about 99.5 percent by weight of the total monomeric mixture.

References Cited in the file of this patent

UNITED STATES PATENTS

| | | |
|---|---|---|
| 1,881,172 | Daimler | Oct. 4, 1932 |
| 2,694,699 | Laakso et al. | Nov. 16, 1954 |
| 2,812,267 | Garner | Nov. 5, 1957 |